(12) United States Patent
Hsu et al.

(10) Patent No.: US 8,365,132 B2
(45) Date of Patent: Jan. 29, 2013

(54) HIERARCHIAL POWER MAP FOR LOW POWER DESIGN

(76) Inventors: Chih-Neng Hsu, Pingtung County (TW); I-Liang Lin, Hsinchu County (TW); Wen-Chi Feng, Hsinchu County (TW)

(*) Notice: Subject to any disclaimer, the term of this patent is extended or adjusted under 35 U.S.C. 154(b) by 0 days.

(21) Appl. No.: 13/158,471

(22) Filed: Jun. 13, 2011

(65) Prior Publication Data

US 2011/0320991 A1    Dec. 29, 2011

Related U.S. Application Data

(60) Provisional application No. 61/358,002, filed on Jun. 24, 2010.

(51) Int. Cl.
*G06F 9/455* (2006.01)
*G06F 17/50* (2006.01)
(52) U.S. Cl. ......... 716/133; 716/106; 716/109; 716/127
(58) Field of Classification Search .................. 716/106, 716/109, 133, 127
See application file for complete search history.

(56) References Cited

U.S. PATENT DOCUMENTS

2007/0245278 A1* 10/2007 Chen ................................. 716/5
2009/0106720 A1*  4/2009 Nagata ............................. 716/6

* cited by examiner

*Primary Examiner* — Vuthe Siek
*Assistant Examiner* — Brian Ngo
(74) *Attorney, Agent, or Firm* — Kilpatrick Townsend & Stockton LLP

(57) ABSTRACT

A computer-implemented method for debugging the power aspect of an IC design by integrating the power specification expressed in certain power specification format and its corresponding circuit design within a power schematic diagram called power map. Power map is created by using a power data base generated by regrouping the original circuit design hierarchy to new hierarchies defined by the power specification. Power map contains power cell symbols (such as isolation cells, level shifters, power switches) and signal nets, and can show the relationship between power domains. Power map can also display mismatches or errors between the power specification and the circuit design for those signals connecting the power domains. Furthermore, power map can be used in conjunction with simulation result.

5 Claims, 6 Drawing Sheets

1 module aaa( )
...........
always(@clk)
..........
.....
......
end module

2 create power domain Island Vdd -
    include scope
create power domain Island_V1 -
    elments inst1
create supply domain Island_V2 -
    elements inst2
    create supply net V1SW -domain
        Island_V1
create supply net V2 -domain Island_V2
    create supply port Vddp -domain

FIG.1
(PRIOR ART)

| Port Signal List (PD2) | |
|---|---|
| Signal | Value |
| system. clock | x⟶0 |
| system. reset_cpu | NF |
| system. reset_fsm | NF |
| system. CPU_save | NF |

HIERARCHIAL POWER MAP FOR LOW POWER DESIGN

CROSS REFERENCE TO RELATED APPLICATIONS

This application claims the benefit of priority of U.S. Provisional Application No. 61/358,002, filed Jun. 24, 2010, and titled "Method and system for displaying IC design intent with power domain intent," the contents of which are herein incorporated by reference in its entirety.

BACKGROUND OF THE INVENTION

1. Field of the Invention

The present invention relates to a computer-implemented method for debugging low power circuit design in the field of integrated circuit (IC) design, and in particular, to a method for creating an integrated graphic user interface to debug the entire IC design including both logic circuit design and the associated low power network design.

2. Description of the Related Art

With the rapid progress of mobile devices and consumer electronic equipments during recent years, there are more applications such as smart cellular phones, personal mobile computers, MP3 audio players, notebooks and digital cameras to be presented to the public. As more functions and low power consumption are needed in thinner and lighter products, IC designers try to integrate varieties of discrete components on one chip to satisfy these requirements, which includes fewer components for a system design, lower production cost and smaller size of Printed Circuit Board (PCB). For example of a system-on-chip (SoC) design, it becomes more and more complex and harder to debug as more and more digital circuit design and low power network design are integrated into one chip. In many low power designs, a circuit design is divided into many parts and each part has a power supply, those parts are called power domains. In other words, power domain is a collection of instances, pins and ports that can share the same power distribution network (voltage). Some of the power domains can be turned on or off by a power switch. The main idea of using power switch is to turn off massive unused parts of the design and, as a result, conserve power consumption.

An isolation cell is used to isolate signals between two power domains where one is switched on and one is switched off. The most common usage of such cells is to isolate signals originating in a power domain that is being switched off, to the power domain that receives these signals and that remains switched on; an isolation cell ensures that when a power domain is turned off, its output will have some pre-defined or latched value, and this is why other active domains are not affected by turning some domains off.

In addition, a level shifter is required to change one voltage level into another voltage level across different power domains. Therefore, low power SoC design will contain not only pure digital circuits but also a sizeable power network with a plurality of power components controlled by control circuits.

Please refer to FIG. 1, digital circuit design is conventionally implemented in hardware description language (HDL), such as Verilog code 1. For the purpose of clarity, a term "power specification" is defined herein as the descriptions of the power intent (intended power behavior) on a circuit design. In order to implement low power network, the power description 2 specified in some power format such as Cadence Common Power Format (CPF) or Unified Power Format (UPF) is generally used to capture the low power information to allow designers to implement low power network design in a separate file without modifying the Verilog code 1. The power format is just a format to describe low power intent for design implementation, analysis and verification, and it is not limited to the CPF or UPF as long as it serves the low power design purpose.

In order to specify low power design constraints, it is required to specify a power supply network that can control the distribution of power so as to minimize energy consumption. Using UPF, one can easily specify the network at an abstract level. This network comprises supply ports, supply nets, and power switches, and is a high-level abstraction of the electrical network of the power aspect of the chip. Supply ports provide supply interfaces to power domains and switches, whereas supply nets connect supply ports. Since the supply network is specified apart from the logic design, the logic design specification remains independent of power supply network specifications.

Since traditional hardware description languages (HDL) are not adequate to specify the power design information, power format, such as UPF, provides a format without touching the existing HDL codes. For instance, UPF provides a command, create_power_domain, for creating a power domain and grouping the design instances belonging to the power domain. Other power components, such as power switches, isolation cells, and level shifters can be easily created by using the corresponding commands defined by power formats such as UPF.

Once the Verilog design and the power design based on the power format are taken into consideration, the entire IC design can be analyzed and subsequently a simulation to debug the IC design can be performed; but the visibility of the boundaries between power design and the pure digital design is low since there is no clear view to allow the designers to comprehend those boundaries in global view because it is required to visualize two separate text files to understand the relationship between the power network design and the circuit design; therefore designers have to dig into the massive Verilog code embedded with power components in the simulation database to debug the entire low power chip design.

Furthermore, circuit designers are mainly focusing on the functionalities of the circuit design, and hence they will build the hierarchies of the circuit design based on the functional and logic view. However, power designers will prefer to have the design hierarchies in physical form which can be defined by power format having a plurality of power domains within the power network design. As a result, it is inefficient and error prone for the designers to debug the entire chip if low power network design can not be viewed in the top level to interact with the power designer; therefore it is important to have a user graphic interface having the power network design in the top level while the associated digital design is viewable under power domains, so that the entire design can be viewed with main debugging focused on the power network design. In order to solve this problem, what is needed is a single integrated graphic user interface to view and debug the low power network with the associated digital circuit design which is regrouped and linked automatically under the power domains of the low power network, without requiring the designers to go back and forth between power specification codes and HDL codes to debug the design correctness between the low power network and the associated digital circuit across the entire chip.

SUMMARY OF THE INVENTION

An object of this invention is to provide a solution to display low power information in a graphic window called power map having the low power information visible at the top level of the power map, which will help user to understand the power structure and the relationship between power network design and circuit design quickly for easy debugging, wherein the power map includes power domains, isolation cells, level shifters, power switches and power supplies.

One embodiment in the present invention is to provide a computer-implemented method for generating and displaying a power map, which is a power schematic diagram in a graphic window to show the low power network design based on the low power information defined in a power format in top level, to allow designers to debug the low power network design and its associated circuit design, in which the power map comprises a plurality of power domain symbols to represent power domains and to link to the associated parts of the circuit design.

One embodiment in the present invention is to provide a method to generate and display a power map by the following steps. First, the original circuit design HDL codes, which are some text files, are transformed into internal structure which generally is hierarchical structure called circuit design hierarchies and stored in a knowledge data base generated by a HDL parser, and the original circuit design hierarchies of the knowledge data base are regrouped to new hierarchies which are defined by power specification. In the new hierarchies, instances sharing the same power domain are grouped together. After that, the new hierarchies called power domain circuit design hierarchies are stored in a power data base. Finally, the power map is created from the power data base; it can also display the mismatches or errors between the power specification and the circuit design for those improperly handled signals that connect the power domains.

The present invention discloses that the power map comprises low power symbols such as power domain symbols, isolation cells, level shifter cells, and power switch cells. Furthermore, the power map is used in conjunction with a simulation result to provide debugging information to the designers, such as displaying the current values of simulation result for signals in the power map at a specific simulation time or displaying the waveforms of simulation result for a period of simulation time in a waveform window by dragging and dropping selected signals in the power map into the waveform window. Moreover, the power map also provides a methodology to detect which HDL signals are not covered by isolation connection and level shifter connection, and will invoke this function automatically when power map is created.

A feature of the power map, which is displayed in a graphic window, is that it provides some active annotation to easily communicate and interact with users. Accordingly, it is more user friendly to let users debug power network together with digital circuit design in an interactive interface.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein:

FIG. 1 is a diagram illustrating conventional low power digital circuit design methodology;

DETAILED DESCRIPTION OF THE INVENTION

The detailed explanation of the present invention is described as following. The described preferred embodiments are presented for purposes of illustrations and descriptions, and they are not intended to limit the scope of the present invention.

Figure 2:
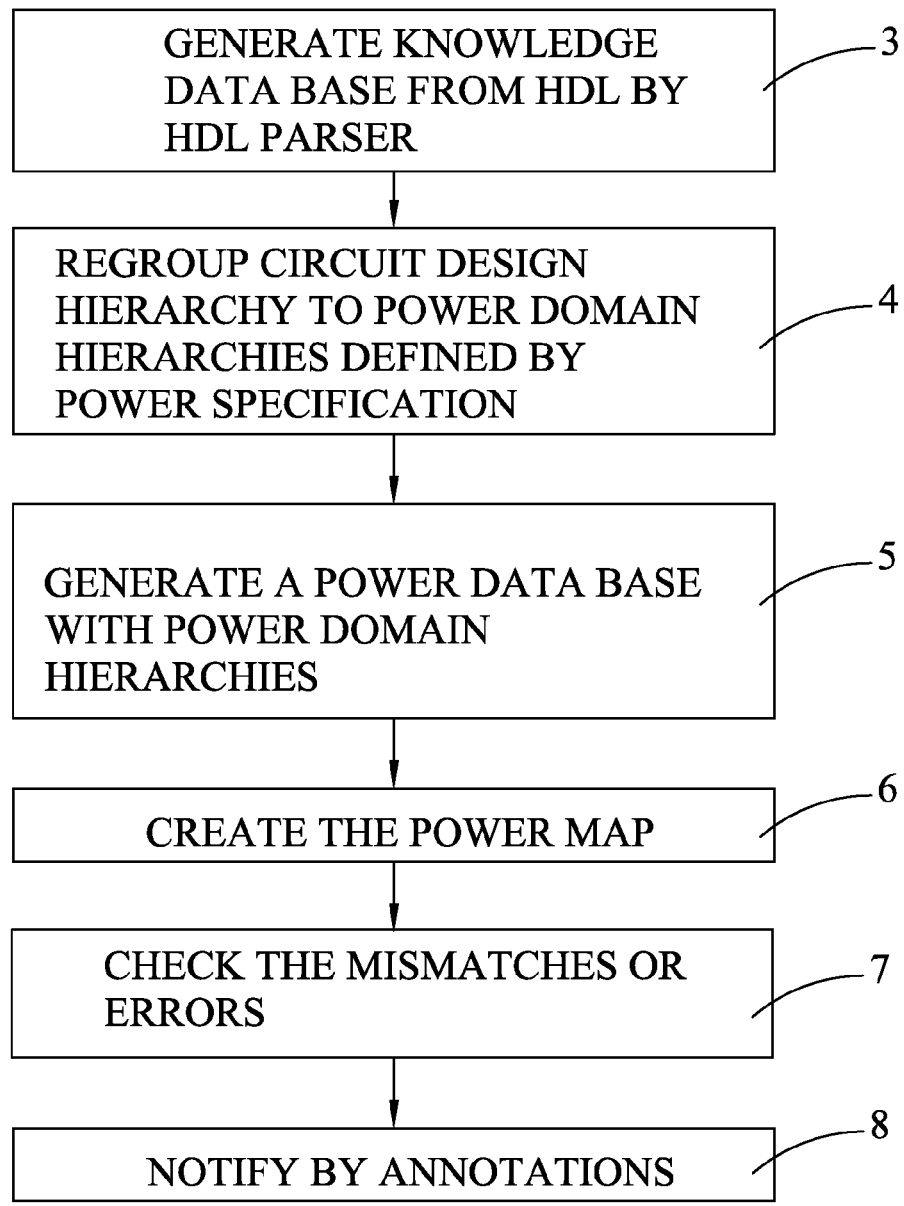
FIG. 2 is a flow chart describing the steps of creating the power map.

In one embodiment, the computer-implemented method for creating the power map of this invention comprises the following steps as shown in FIG. 2. In step 3, the original text-based circuit design HDL codes are parsed and transformed into internal structure and stored in a knowledge data base. The knowledge data base is an internal computer-readable data structure, which is generally hierarchical structure but not limited in hierarchical or flattened structure, of the circuit design and could easily be manipulated by software, and the knowledge base can be generated by a HDL parser. In step 4, power designs specified in CPF or UPF are parsed and transformed into internal structure by a CPF or UPF parser. After that, the original circuit design hierarchy in the knowledge data base is regrouped into new design hierarchies defined by the power specification having a plurality of power domains. In the new hierarchies, the instances sharing the same power domain are grouped together. Again, the original design is not limited to hierarchical design or flattened design. If the original circuit design is flattened and stored in the knowledge data base, it will be partitioned into multiple power domains as well. In step 5, the new design hierarchies are stored in a power data base and transformed into internal structure which is an internal computer-readable data structure of the circuit design and the power design, and can easily be manipulated by software.

Please continue to refer to FIG. 2. In step 6 the power map is created based on the power data base, and displayed in a user-friendly GUI (graphical user interface) window; there are many objects in the power map, such as power domain symbols and isolation cells which will be further described in detail in FIG. 4A hereafter. If a power domain in a power map is invoked in the user-friendly GUI window, for example, being clicked by the user, the associated circuit design that belongs to the power domain will be invoked. So it's easy for users to debug entire chip with power network design and the related HDL code.

Accordingly, in step 7 some static checking can be performed and the mismatches or errors can be identified between the power specification and the circuit design for those improperly handled signals that connect the power domains. The mismatches or errors can be shown to users by some kind of annotations such as dotted lines, symbols, or colored highlights as illustrated in step 8.

Figure 3:
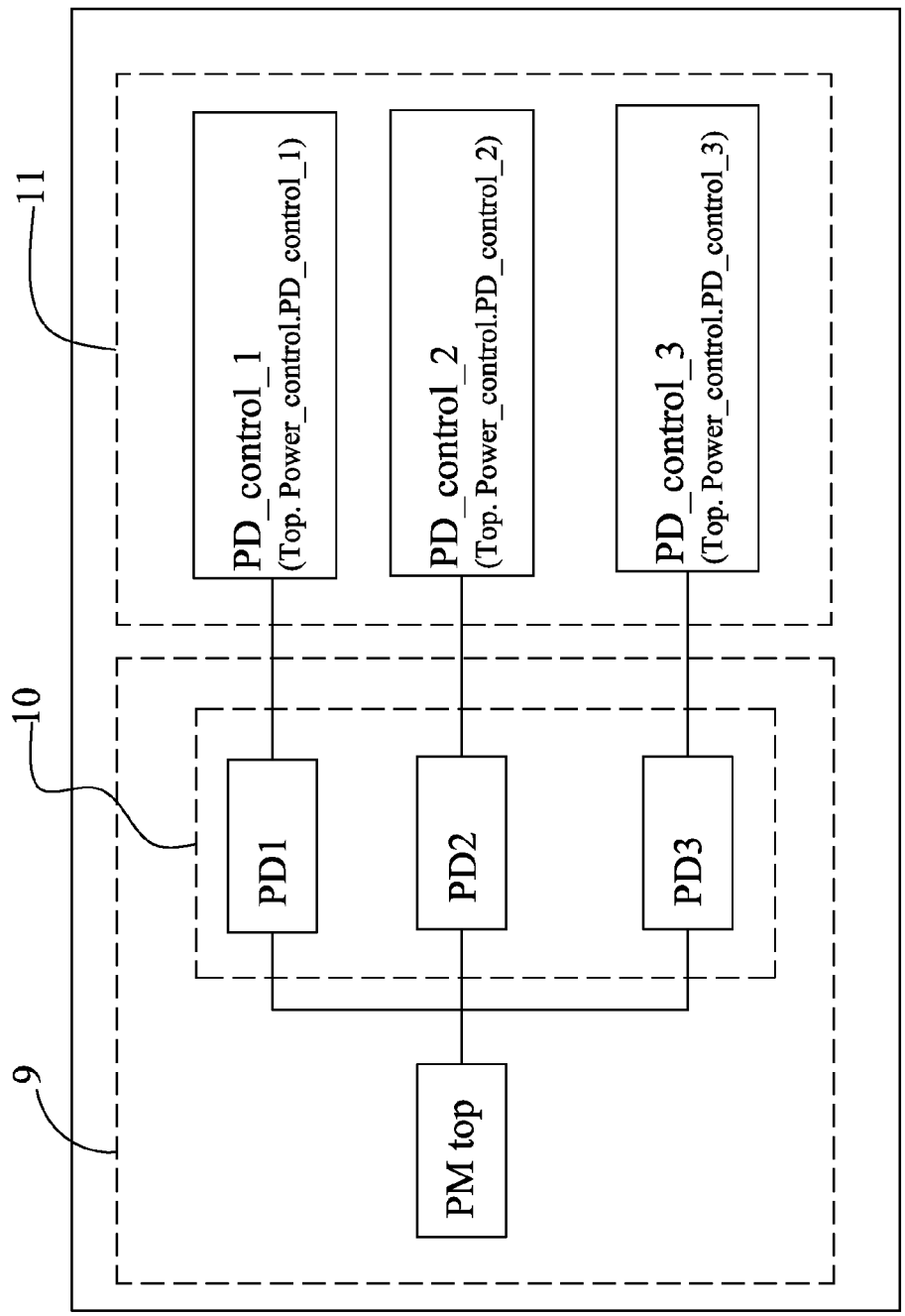
FIG. 3 illustrates a new hierarchical circuit design defined by the power specification after regrouping the original circuit design hierarchy of the circuit design described in Verilog language.

To further explain the abovementioned regrouping, please refer to FIG. 3, which shows a frame 9 of the power map with a new hierarchy 10 with low power network design by regrouping the original circuit design hierarchy 11 of HDL into the new hierarchy 10 defined by the power specification having a plurality of power domains, in which each of the power domains comprises a plurality of instances from the circuit design sharing the same power domain. The original design hierarchy 11 has a top level containing a plurality of instances including a module Power_control with three instances PD_control_1, PD_control_2 and PD_control_3. After regrouping in power map, there is a top level called PM_top; instance PD_control_1 is under power domain PD1, instance PD_control_2 under power domain PD2, and instance PD_control_3 under power domain PD3.

After new hierarchies are defined by the power specification having a plurality of power domains, they can be stored in a power data base, which is an internal computer-readable data structure integrating the circuit design and power network design information, and can be manipulated by software.

Figure 4A:
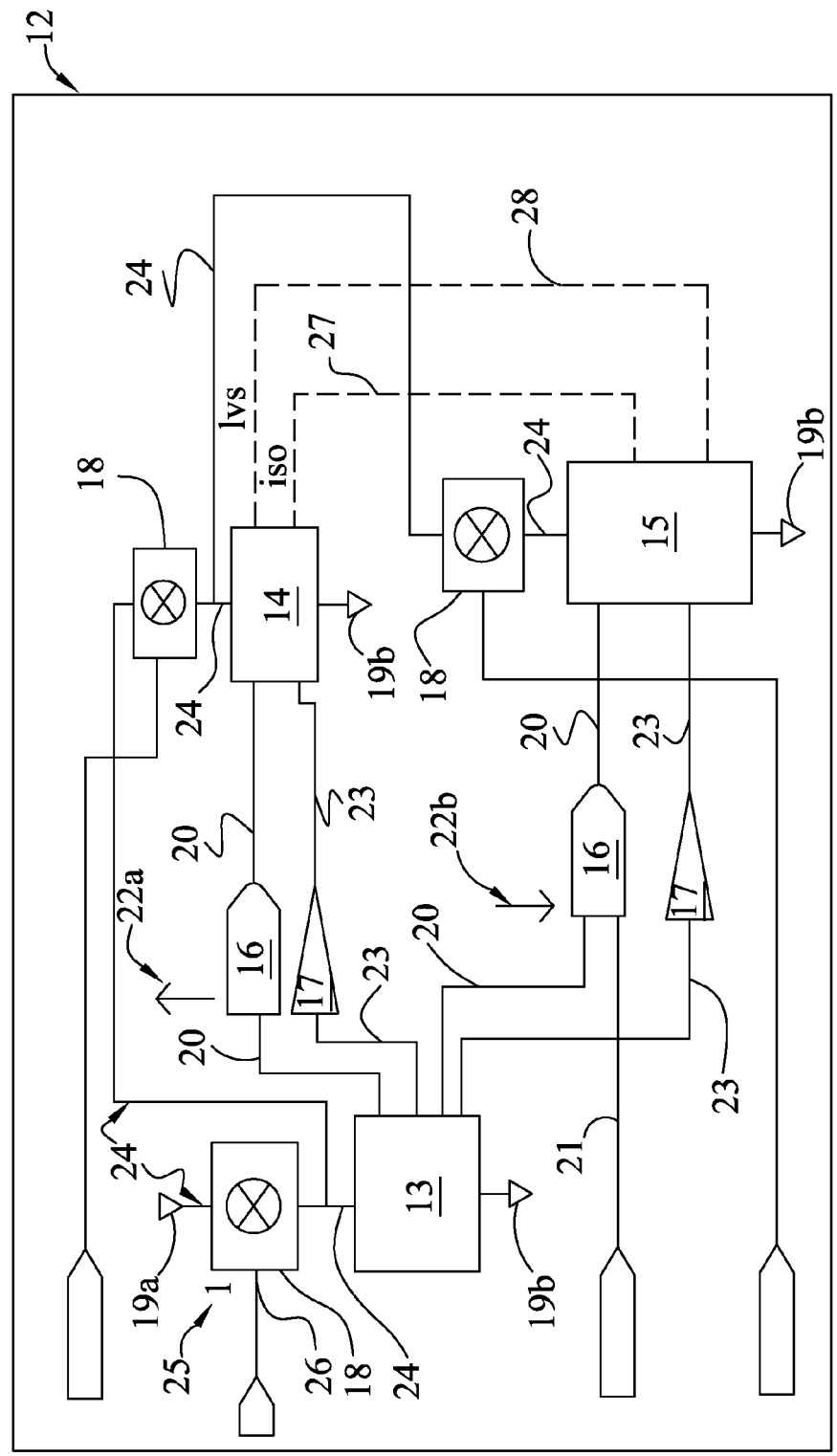
FIG. 4A is a schematic diagram showing a created power map.

After the power data base is generated, the power map can be displayed to show the power network design, as shown in FIG. 4A. The power map 12 comprises a plurality of power domain symbols 13, 14 and 15, which are connected to grounds 19b respectively, to represent power domains, at least one isolation cell 16, at least one level shifter cell 17, at least one power switch cell 18, and at least one power supply 19a.

An isolation cell 16 representing isolation command comprises a plurality of isolation nets 20 to connect with power domains and an isolation condition net 21 to present the isolation condition expression, and displays isolation trigger status by a trigger status symbol on the top-left of the isolation cell 16—if the condition's value is "1", the trigger status is successful and the trigger status symbol will display an up-arrow 22a, otherwise the trigger status fails and the trigger status symbol will display a down-arrow 22b.

A level shifter cell 17 representing level shifter command comprises a plurality of level shifter nets 23 to connect with power domains.

A power switch cell 18 representing power switch comprises a plurality of power switch nets 24 to connect with power supply 19a, power domains, or other power switch cells. Moreover, power switch cell 18 also comprises a condition pin 26. When users turn on active annotation, condition value 25 will be annotated on condition pin 26 automatically. The active annotation is a mechanism to interact with users for easily communicating with the power map. The active annotation can be turned on by some kind of "active annotation mechanism". For example, it may be turned on by single or double-clicking a highlighted icon or a symbol, or by selecting an item of a right mouse button menu herein to annotate the condition value 25 on the condition pin 26.

Furthermore, in one embodiment, power map displays a signal which is not properly isolated by a dotted line of red color and named with "iso" 27 and a signal without level shifter by a dotted line of red color and named with "lvs" 28.

Figure 4B:
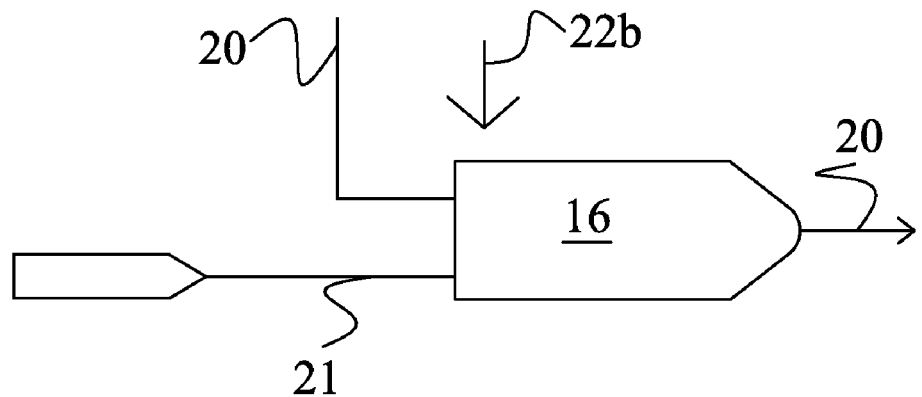
FIG. 4B is a schematic diagram showing the isolation rule.
Figure 4C:
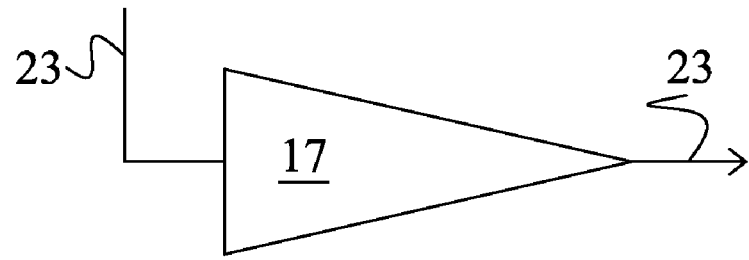
FIG. 4C is a schematic diagram showing the level shifter rule.
Figure 4D:
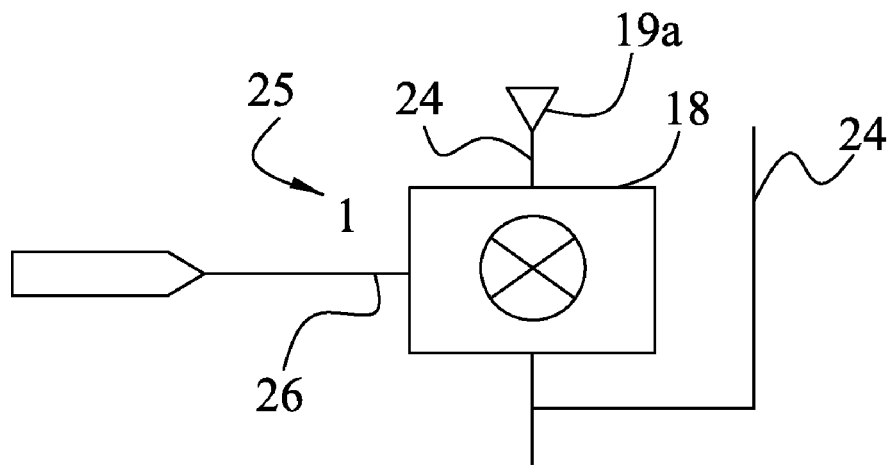
FIG. 4D is a schematic diagram showing the power switch rule.

To understand the power map better, there are rules for each power component used in a power map, as shown in the following:
1. For Isolation Rule (CPF/UPF):
    Please refer to FIG. 4B. Power map uses isolation cell 16 to represent isolation command in a power specification. Isolation cell 16 comprises an isolation condition net 21 to present the isolation condition expression, and displays isolation trigger status by a trigger status symbol on the top-left of the isolation cell. If the condition's value is "1", the trigger status is successful and the trigger status symbol will display an up-arrow; otherwise the trigger status fails and the trigger status symbol will display a down-arrow 22b.
2. For Level Shifter Rule (CPF/UPF):
    Please refer to FIG. 4C. Power map uses level shifter cell 17 to represent level shifter command.
3. For Power Switch (CPF/UPF):
    Please refer to FIG. 4D. Power map uses power switch cell 18 to represent the power switch, which will show power switch condition value 25 on condition pin 26 when users turn on the active annotation (such as double-clicking the power switch cell 18).
4. For Non-Covered Connection:
    A signal connection which is connecting power domains but not specified by isolation rules and/or level shifter rules in the power specification will be called Non-Covered Connection. Please refer to FIG. 4A. Power map 12 provides a methodology to detect which HDL signals are not covered properly by isolation rules or level shifter rules, and will invoke this function automatically when power map 12 is created. In one embodiment, power map 12 will show a signal which is not properly isolated by a dotted line of red color and named with "iso" 27, and will show a signal without level shifter by a dotted line of red color and named with "lvs" 28.

After the power map is generated, static checking can be performed to detect all the mismatches or errors between the power specification and the circuit design to notify user where such mismatches or errors occur. Mismatches or errors can occur in many ways, for example, the connectivity is wrong in the isolation/level-shifter cell connection, control signal is missing or mismatched in power control signal which is connected to a power switch, the isolation cells are useless due to some mismatch or missing control signals or there are some improperly covered isolation connections or improperly covered level shifter connections due to missing isolation and/or level shifter cells for the nets connecting power domains. Furthermore, in order to make sure, if indeed, there are both isolation and level shifter connections between two power domains which have HDL signals between them, power map will create virtual nets, called virtual power rule nets hereafter, between them to alert designers. For example, if two power domains do not have isolation and/or level shifter connections between them, power map will create a virtual level shifter power rule net and/or a virtual isolation power rule net between them respectively, and the impacted signals of each of the two virtual power rule nets will be all the HDL signals between the two power domains.

Please refer back to FIG. 4A. Each power domain symbol can be invoked to link to the part of the circuit design that belongs to the power domain. In one embodiment when users invoke the power domain symbol 13 by single- or double-clicking it, the part of the circuit design that belongs to the power domain can be invoked to allow users to view the circuit design in order to debug entire chip including power network design and the original HDL code.

Figures 5, 6:
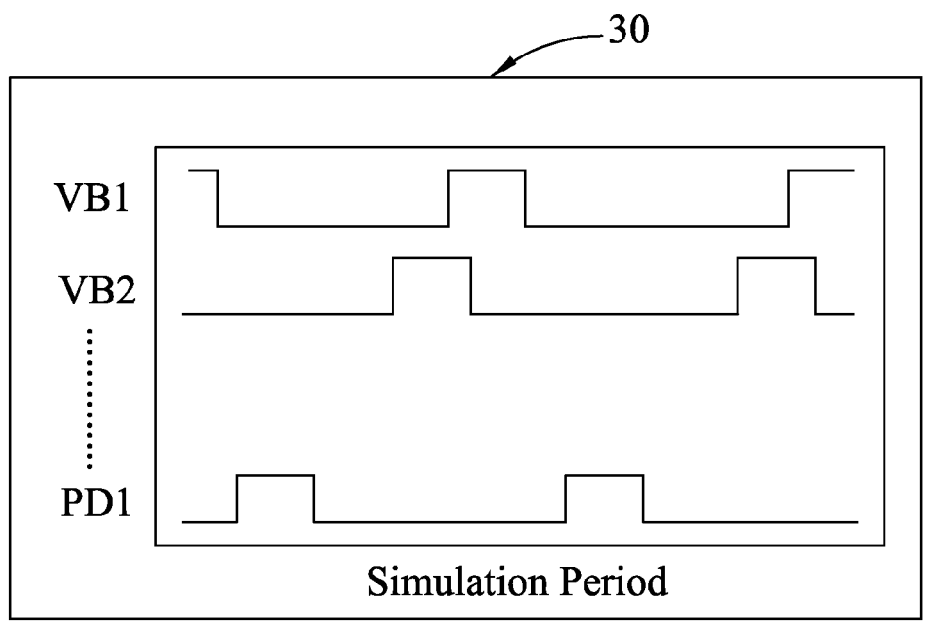
FIG. 5 is a graph of the signal value list window.
FIG. 6 is a graph of the waveform window.

Another function of the power map is that it can display the current values of simulation result for signals in it at a specific simulation time. In one embodiment, the power map comprises a signal value list window 29 as shown in FIG. 5 to make debugging more easily. When users turn on active annotation, such as single- or double-clicking a highlighted icon or a symbol, or selecting an item in a right mouse button menu, the signal value list window 29 will display the values of the simulation result for corresponding signals in the power map at a specific simulation time. Moreover, in another embodiment, the power map can also work with a waveform window

30 as shown in FIG. 6, which can display waveforms of simulation result for a period of simulation time when users drag and drop selected signals in the power map into it. For example, when users drag an isolation cell and drop it into the waveform window 30, the nets connecting the isolation level are added automatically to the waveform window 30 and will be regarded as variables (VBs) to display their waveforms automatically for a period of simulation time as shown in FIG. 6. Similarly, the waveforms of the power component (e.g., power domain, PD) signals are also able to be displayed in the waveform window 30. In yet another embodiment, when users move the cursor in the waveform window 30 to a certain simulation time, nets in the power map are annotated with values of corresponding signals at that specific time. Accordingly, it is more user-friendly to let users debug power network together with digital circuit design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer-implemented method for debugging the power aspect of an IC design specified in a power specification format by displaying a power map that integrates the power specification and its corresponding circuit design, the method comprising he steps of:
   a. generating a knowledge data base from the circuit design;
   b. generating a power data base according to the power specification and the knowledge data base;
   c. generating and displaying the power map by using the power data base, wherein the power map comprises a plurality of power domains and each of the plurality of power domains is associated with the part of the circuit design that belongs to the power domain, wherein the power map is generated and displayed by using a computer; and
   d. checking and displaying the mismatches or errors according to the power specification and the circuit design for those signals connecting the power domains, comprising the sub-steps of:
      d1. if there are HDL signals between any two power domains and there are not any isolation connections between them, the power map will display a named virtual isolation connection net between the two power domains; and
      d2. if there are HDL signals between any two power domains and there are not any level shifter connections between them, the power map will display a named virtual level shifter connection net between the two power domains.

2. The computer-implemented method in accordance with claim 1, wherein named virtual isolation connection nets and named virtual level shifter connection nets are in either dotted or colored lines.

3. The computer-implemented method in accordance with claim 1, wherein named virtual isolation connection nets and named virtual level shifter connection nets are named with prefixes "iso" and "lvs" respectively.

4. A computer-implemented method for debugging the power aspect of an IC design specified in a power specification format by displaying a power map that integrates the power specification and its corresponding circuit design, the method comprising the steps of:
   a. generating a knowledge data base from the circuit design;
   b. generating a power data base according to the power specification and the knowledge data base; and
   c. generating and displaying the power map by using the power data base, wherein the power map comprises a plurality of power domains and each of the plurality of power domains is associated with the part of the circuit design that belongs to the power domain, wherein the power map further comprises at least one isolation cell to represent isolation command, wherein the isolation cell comprises a plurality of isolation nets to connect power domains, wherein the isolation cell further comprises a trigger status symbol for displaying isolation trigger status, wherein the power map is generated and displayed by using a computer.

5. The computer-implemented method in accordance with claim 4, wherein the trigger status symbol displays an up-arrow if the trigger status is successful, and a down-arrow if the trigger status fails.

* * * * *